(12) United States Patent
Samuel et al.

(10) Patent No.: US 10,747,526 B2
(45) Date of Patent: Aug. 18, 2020

(54) APPARATUS AND METHOD TO EXECUTE PREREQUISITE CODE BEFORE DELIVERING UEFI FIRMWARE CAPSULE

(71) Applicant: DELL PRODUCTS, LP, Round Rock, TX (US)

(72) Inventors: Balasingh Ponraj Samuel, Round Rock, TX (US); Steven A. Downum, Pflugerville, TX (US); Anand P. Joshi, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/014,686

(22) Filed: Jun. 21, 2018

(65) Prior Publication Data
US 2019/0391799 A1    Dec. 26, 2019

(51) Int. Cl.
G06F 8/65 (2018.01)
G06F 13/16 (2006.01)
G06F 1/26 (2006.01)
G06F 9/4401 (2018.01)

(52) U.S. Cl.
CPC ............ *G06F 8/65* (2013.01); *G06F 1/266* (2013.01); *G06F 13/1668* (2013.01); *G06F 9/4401* (2013.01); *G06F 9/4406* (2013.01); *G06F 9/4411* (2013.01)

(58) Field of Classification Search
CPC ... G06F 8/63; G06F 8/65; G06F 8/654; G06F 8/665; G06F 1/266; G06F 9/4406; G06F 13/1668; G06F 11/0712; G06F 11/1433
USPC ......................................................... 717/168
See application file for complete search history.

(56) References Cited

U.S. PATENT DOCUMENTS

| | | | |
|---|---|---|---|
| 9,235,404 B2 | 1/2016 | Cavalaris et al. | |
| 9,772,838 B2 | 9/2017 | Cavalaris et al. | |
| 2012/0117381 A1* | 5/2012 | Lo et al. ................ | G06F 8/63 713/156 |
| 2014/0007069 A1* | 1/2014 | Cavalaris et al. ...... | G06F 8/654 717/170 |
| 2017/0286086 A1* | 10/2017 | Narasimhan et al. .. | G06F 8/654 |

* cited by examiner

Primary Examiner — Wei Y Zhen
Assistant Examiner — Mohammed N Huda
(74) Attorney, Agent, or Firm — Larson Newman, LLP

(57) ABSTRACT

A method includes creating, by system firmware at an information handling system, a virtual Advanced Configuration and Power Interface (ACPI) bus device. A management service event is registered by a bus device driver corresponding to the virtual ACPI bus device. The management service event, when executed, determines whether a target device is in a condition to receive revised firmware.

15 Claims, 5 Drawing Sheets

APPARATUS AND METHOD TO EXECUTE PREREQUISITE CODE BEFORE DELIVERING UEFI FIRMWARE CAPSULE

FIELD OF THE DISCLOSURE

This disclosure generally relates to information handling systems, and more particularly relates to executing prerequisite code before delivering a UEFI capsule.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems. The software resources include device drivers and firmware that control operation and interoperability of system components.

SUMMARY

A method may include creating, by system firmware at an information handling system, a virtual Advanced Configuration and Power Interface (ACPI) bus device. A management service event is registered by a bus device driver corresponding to the virtual ACPI bus device. The management service event, when executed, determines whether a target device is in a condition to receive revised firmware.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
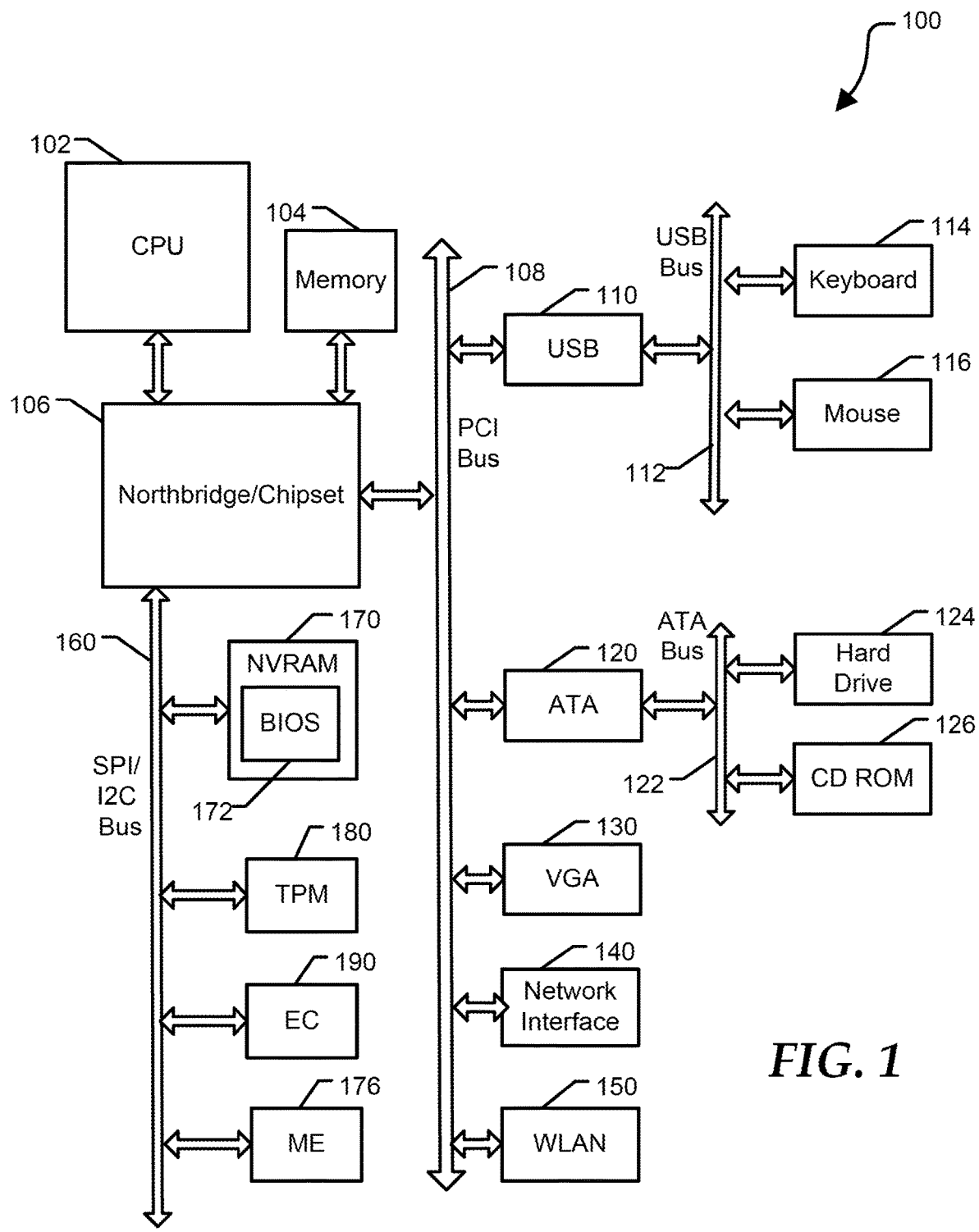
FIG. 1 is a block diagram of an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

The Windows operating system provided by Microsoft Corporation has become ubiquitous with personal computers used in the home and in business. Microsoft, together with Intel and other X86 based microprocessor developers and original equipment manufactures (OEMs), have created a broad range of specifications and industry standards that govern operation of information handling systems. Microsoft Windows today provides a broad range of products in addition to the Windows operating system. The so-called Windows environment includes tools and protocols to establish security of critical operating software and devices. For example, Windows Update (WU) is a service provided by Microsoft that manages the distribution of software updates, including updates to the Windows operating system itself as well as device drivers and firmware developed by Microsoft, OEMs, and other providers.

While WU has addressed many security related vulnerabilities that compromised previous software update protocols, the capabilities of WU are not without limitations. In particular, a target system does not have full control over the WU firmware update process. Once a firmware update package is published at the WU distribution server, WU can arbitrarily push the new firmware to a target system. In certain scenarios, the target computer system is not ready to receive the firmware. For example, WU can initiate update of primary basic input output system (BIOS) firmware at mobile device without verifying that the device has enough battery power to complete the update process. For another example, WU can attempt to update a firmware at a Trusted Platform Module (TPM) while the TPM is still owned by a process. Often, an information technology administrator may simply have reason to maintain particular firmware at a specific revision level. Unlike the WU firmware update process, the WU driver update process does provide a means for a target system to execute code in order to check the system status before installing an updated driver at the system.

Techniques disclosed herein utilize the WU driver update mechanism to update system firmware rather than the WU firmware update capsule. In particular, a combination of one virtual bus driver and one or more function drivers are used to manage and control firmware updates. The system BIOS, now implemented pursuant to the Unified Extensible Firmware Interface (UEFI) specification, creates an Advanced Configuration and Power Interface (ACPI) device ID corresponding to a virtual bus device. A driver is associated with this virtual ACPI device. The virtual bus driver is static and is loaded every time the information handling system boots. The virtual bus driver allows for the management of multiple types of firmware capsule updates by controlling availability of virtual child firmware update devices. In particular, the virtual bus driver can register a device management service event that performs prerequisite testing to verify that particular devices are ready to receive updated firmware.

After executing the prerequisite tests and having determined that particular devices are ready for updating, the virtual bus driver can create one virtual child device and a corresponding function driver for each type of firmware that requires a firmware update. For example, a virtual child device and associated function driver can be implemented for system BIOS firmware updates, and another virtual child device for TPM firmware updates. When a virtual function driver for one of these virtual child devices is submitted to the WU distribution server, its version has a one to one correspondence to a firmware capsule version. The driver submission package also includes the firmware capsule itself. As the new driver version is distributed on WU, it will trigger WU to push the updated driver package containing the updated firmware capsule to target systems.

When WU updates one of these virtual function drivers, it loads the function driver using Windows PnP Manager. The function driver's Plug and Play driver handler executes the driver dispatch code (PnP dispatcher). Any pre-condition check code can be added in any of these dispatch functions. Since the function driver is executing code in kernel level, the system device components can be monitored and checked directly by the virtual function driver. For example, the power requirement or TPM status can be checked in the PnP handler. Then the function driver delivers the capsule if the pre-condition check is passed. There are multiple ways to deliver the capsule. For example, the function driver may copy the capsule to physical memory or Extensible Firmware Interface System Partition (ESP) and set a capsule flag in BIOS NVRAM or a CMOS variable. When the information handling system reboots, the system BIOS checks the capsule flag to determine if there is a capsule payload in physical memory or on the ESP. If the capsule payload is identified, the system BIOS uses the UEFI capsule mechanism to update system firmware components.

The disclosed techniques leverage the WU distribution infrastructure and associated security protocols, but allows for implementation of additional or proprietary system checks before delivering the update package. Furthermore, these techniques do not require static EFI System Resource Table (ESRT) lookup. In particular, the disclosed techniques do not require waiting for the ESRT to update after a reboot in order to determine if a staged capsule should be delivered. In contrast to the WU firmware update capsule mechanism where the BIOS can handle precondition checks only after capsule delivery, the present techniques allow for all prerequisite checks be performed before a corresponding capsule is delivered, hence no extra reboots of the information handling system are required to check delivery viability. The techniques disclosed herein can be better understood with reference to FIGS. 1-6, below.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, a trusted platform module (TPM) 180, and an embedded controller (EC) 190. As described above, EC 190 is responsible for performing low level hardware tasks including thermal management and power management operations. NVRAM 170 can be referred to as a SPI flash storage device, BIOS SPI, and the like. System 100 can further include a management engine (ME) 176. Like EC 190, ME 176 can operate independently of primary CPU core processors, and is responsible for performing the earliest stages of initialization of system 100. ME 176 is configured to authenticate the first block of BIOS code stored at NVRAM 170 before releasing the x86 processor from reset. Accordingly, ME 176 provides a hardware root of trust for system 100.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that aspects of the disclosed systems and methods can be implemented at substantially any information handling system having configurable firmware.

Figure 2:
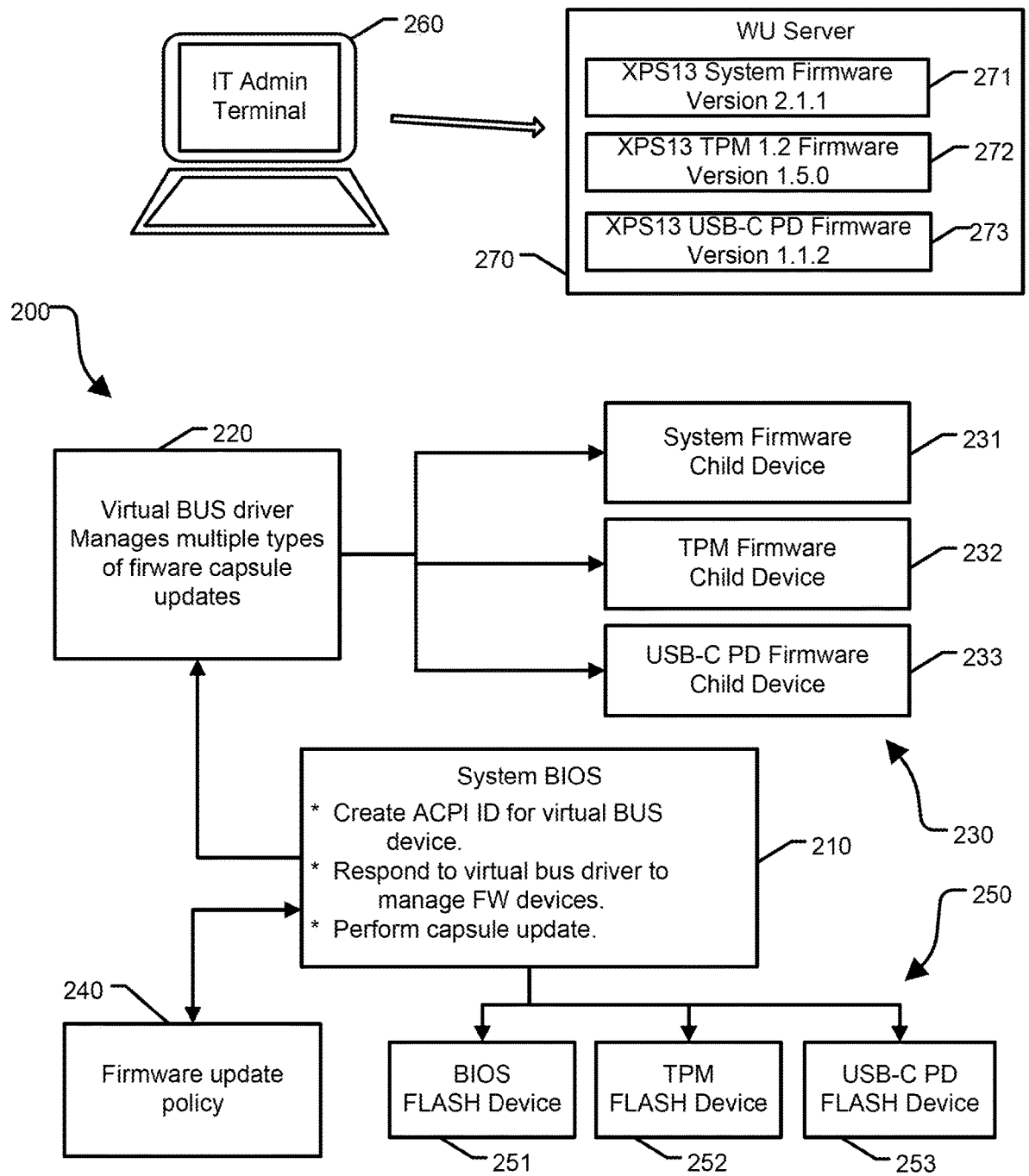
FIG. 2 is a functional representation of an information handling system according to a specific embodiment of the present disclosure.

FIG. 2 shows a functional representation of an information handling system 200 according to a specific embodiment of the present disclosure. System 200 includes a system BIOS 210, a virtual bus driver 220, virtual child devices 230, a firmware update policy 240, and devices 250. FIG. 2 also shows an IT administration terminal 260 and a Windows Update server 270. Devices 250 represent components of system 200 that include firmware that can be updated. For the present example, the devices 250 include a BIOS FLASH device 251 to store the primary system BIOS of system 200, a TPM flash device 252, and a USB-C power delivery (PD) device 253. During operation, virtual bus driver 220 may create one or more virtual child devices 230 corresponding to each of devices 250, including a virtual system firmware child device 231, a virtual TPM firmware child device 232, and a virtual USB-C PD firmware child device 233. Also during operation, firmware corresponding to devices 250 can be uploaded to WU server 270 for distribution, including system firmware 271, TPM firmware 272, and USB-C PD firmware 264. However, the firmware 271, 272, and 273 are drivers and associated UEFI update capsules corresponding to virtual child devices 231, 232, and 233, rather than devices 251, 252, and 253.

During operation, system BIOS 210 creates an ACPI ID corresponding to a virtual ACPI bus device. The virtual ACPI bus device does not correspond to a real device at information handling system 200. After system 200 completes a boot process and loads an OS, such as Windows 10, bus driver 220 is associated with the virtual ACPI bus device created by BIOS 210. In an embodiment, bus driver 220 can determine whether one or more of devices 250 are in a proper condition to receive updated firmware. In particular, bus driver 220 can include code, referred to herein as prerequisite code, which monitors a predetermined set of system attributes according to firmware update policy 240. For example, the prerequisite code can determine whether a system 200 is receiving mains power or whether a battery supplying power to system 200 has sufficient charge to complete a firmware update process to update system firmware at BIOS FLASH device 251. If the prerequisite code determines that system 200 does have sufficient power to complete a firmware update procedure, bus driver 220 creates virtual child device 231 corresponding to system firmware. A function driver is associated with child device 231, and a corresponding driver update can be distributed by WU 270. In particular, driver update 271 at WU 270 can include a UEFI update capsule that includes updated system firmware. When information handling system 200 receives driver update 271, a plug and play (PnP) handler installs the new driver, and system firmware included at the UEFI update capsule can be stored at BIOS FLASH device 251. The preceding process is described in greater detail below.

For another example, the prerequisite code can determine whether TPM 252 is in a proper condition to receive updated firmware. In particular, firmware update policy 240 can specify that TPM 251 can only be updated if TPM 251 is enabled and presently not owned by any software entity. If TPM 251 is ready to receive updated firmware, bus driver 220 creates virtual child device 232 corresponding to TPM firmware. A function driver is associated with child device 232, and a corresponding function driver update can be distributed by WU 270. In particular, a UEFI update capsule that includes updated TPM firmware can be embedded at the updated function driver 272 at WU 270. When information handling system 200 receives driver update 272, the plug and play (PnP) handler installs the new driver, and system firmware included can be updated to the flash device at TPM device 252 using UEFI capsule update methodology. For still another example, the prerequisite code can determine whether USB-C PD device 253 is in a proper condition to receive updated firmware. If USB-C PD device 253 is ready to receive updated firmware, bus driver 220 creates virtual child device 233 corresponding to USB-C PD device firmware. A driver is associated with child device 233, and a corresponding driver update can be distributed by WU 270. In particular, driver update 273 at WU 270 can include a UEFI update capsule that includes updated USB-C PD device firmware. When information handling system 200 receives driver update 273, the plug and play (PnP) handler installs the new driver, and system firmware included can be updated to the flash device at USB-C PD device 253 using UEFI capsule methodology.

For yet another example, the prerequisite code executed by virtual ACPI bus driver 220 can determine whether system 200 is coupled to a docking station before initiating the update of firmware included at the docking station. One of skill will appreciate that the update policy and corresponding prerequisite code described above are only examples. The prerequisite code can be configured to verify that any target device is in a proper condition to receive updated firmware. As used herein, a target device is any subsystem of information handling system 200 that includes firmware that can be updated. In addition to the BIOS system, TPM, USB, and docking station, a target device can include a network interface controller, and the like. It will further be appreciated that the WU firmware update procedure does not support execution of similar prerequisite code prior to receiving the updated firmware from WU 270.

Figure 3:
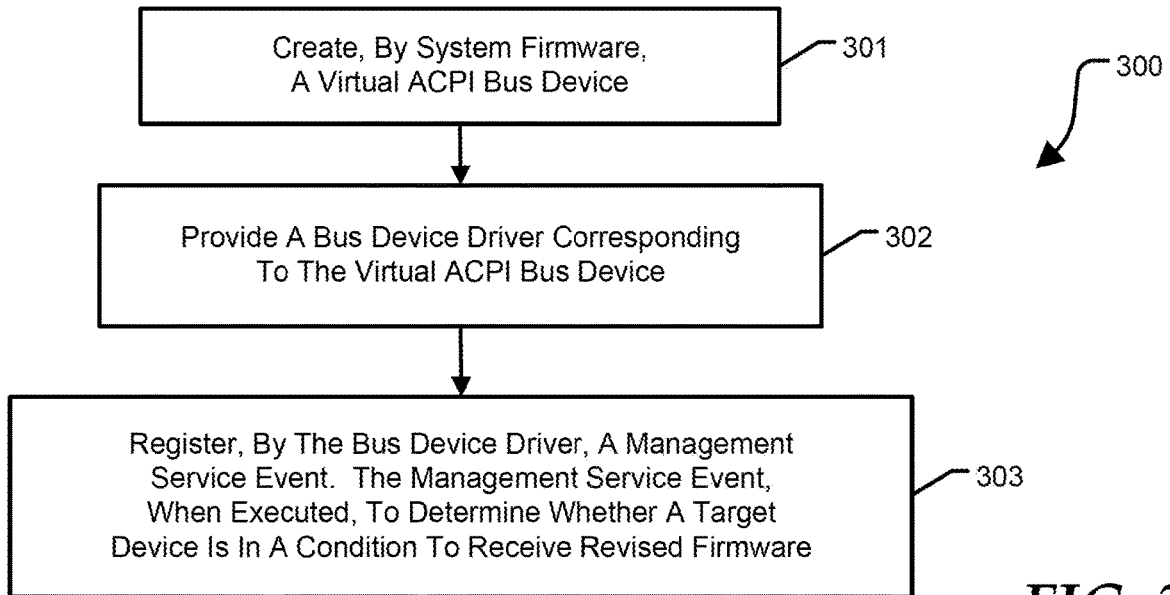
FIG. 3 is a flow diagram illustrating a method for defining a virtual ACPI bus device driver to perform prerequisite testing to determine whether devices are ready to receive updated firmware according to a specific embodiment of the present disclosure.

FIG. 3 shows a method 300 for defining a virtual ACPI bus device driver to perform prerequisite testing to determine whether devices are ready to receive updated firmware according to a specific embodiment of the present disclosure. At block 301, system firmware creates a virtual ACPI bus device. For example, during the boot process at system 200, BIOS 210 can generate an ACPI ID for a virtual ACPI bus device. The boot process completes and transfers control to a Windows loader to load the Windows OS. Method 300 continues at block 302 where a bus device driver corresponding to the virtual ACPI bus device is provided. For example, a PnP manager can identify the virtual ACPI bus device and attaches a driver to the device. The driver may be previously installed at system 200, or may be downloaded from WU server 270. Method 300 completes at block 303 where the bus device driver registers a management service event. The management service event is configured to determine whether a target device is in a condition to receive revised firmware. For example, the management service event can verify that a docking station is presently connected to system 200, for example by querying firmware using System Management BIOS (SMBIOS). In this example, a prerequisite for updating firmware at the docking station is simply determining that information handling system is currently plugged in to the docking station. Only if the prerequisite conditions are satisfied will system 200 allow the firmware update to proceed.

Figure 4:
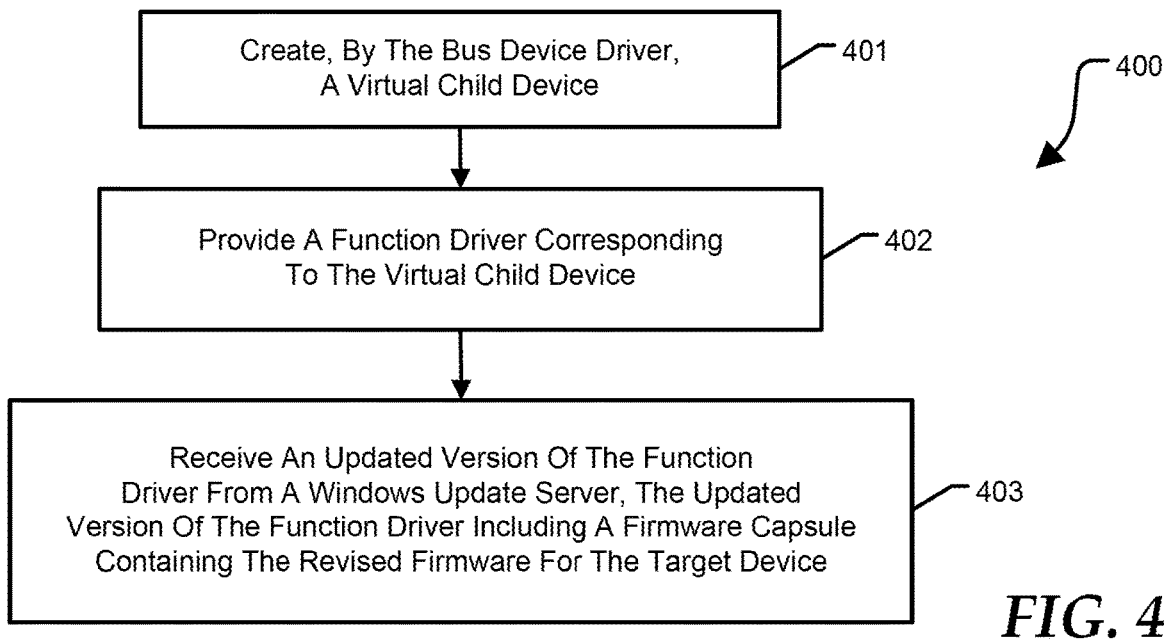
FIG. 4 is a flow diagram illustrating a method for receiving a firmware update according to a specific embodiment of the present disclosure.

FIG. 4 shows a method 400 for receiving a firmware update according to a specific embodiment of the present disclosure. Method 400 may represent a flow of events following the completion of method 300. Method 400 begins at block 401 where the virtual ACPI bus device driver dynamically creates a child device. Continuing the example above, in response to determining that the prerequisite conditions to update the docking station firmware have been met, the virtual ACPI bus device driver creates a child device that is symbolically associated with the docking station. Method 400 continues at bock 402, where a function driver corresponding to the virtual child device is provided. Method 400 completes at block 403 where an updated version of the function driver is received from a WU server. The updated function driver includes a firmware capsule that contains revised firmware for the target device, for example the docking station.

Figure 5:
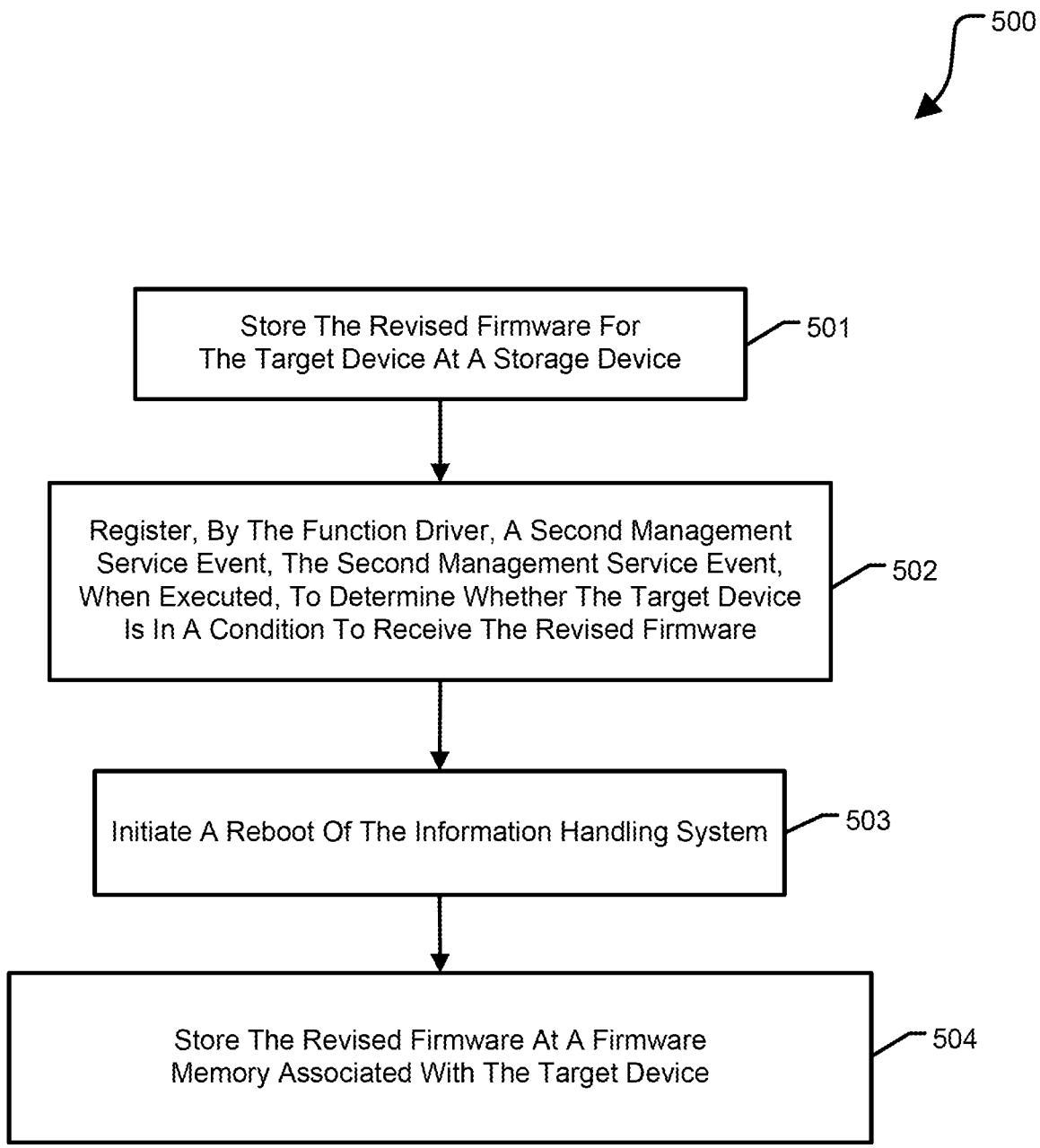
FIG. 5 is a flow diagram illustrating a method for updating firmware according to a specific embodiment of the present disclosure.

FIG. 5 shows a method 500 for updating firmware according to a specific embodiment of the present disclosure. Method 500 may represent a flow of events following the completion of method 400. Method 500 begins at block 501 where revised firmware for the target device is stored a storage device. For example, the capsule associated with the updated function driver received at block 403 can contain a new revision of firmware for the docking station, and the firmware can be stored at system memory 104. Method 500 continues at block 502 where the function driver associated with the virtual child device can register a corresponding management service event, the service event when executed can determine whether the target device is still in a condition to receive the revised firmware. In particular, the PnP handler can install the updated function driver and the driver can create a management event. This management event can provide further prerequisite testing as dictated by firmware update policy 240. For example, the additional prerequisite testing may confirm that the flash device at the docking station is enabled for writing. The function driver can set a flag indicating that the docking station firmware is available and the firmware should be installed during the next boot of system 200. Method 500 proceeds to block 503 where a reboot of the information handling system is initiated. Method 500 concludes at block 504 where the revised firmware is stored at the firmware memory associated with the target device. For example, system BIOS 210 can retrieve the updated docking station firmware from system memory and update the firmware image at a firmware storage device at the docking station.

Figure 6:
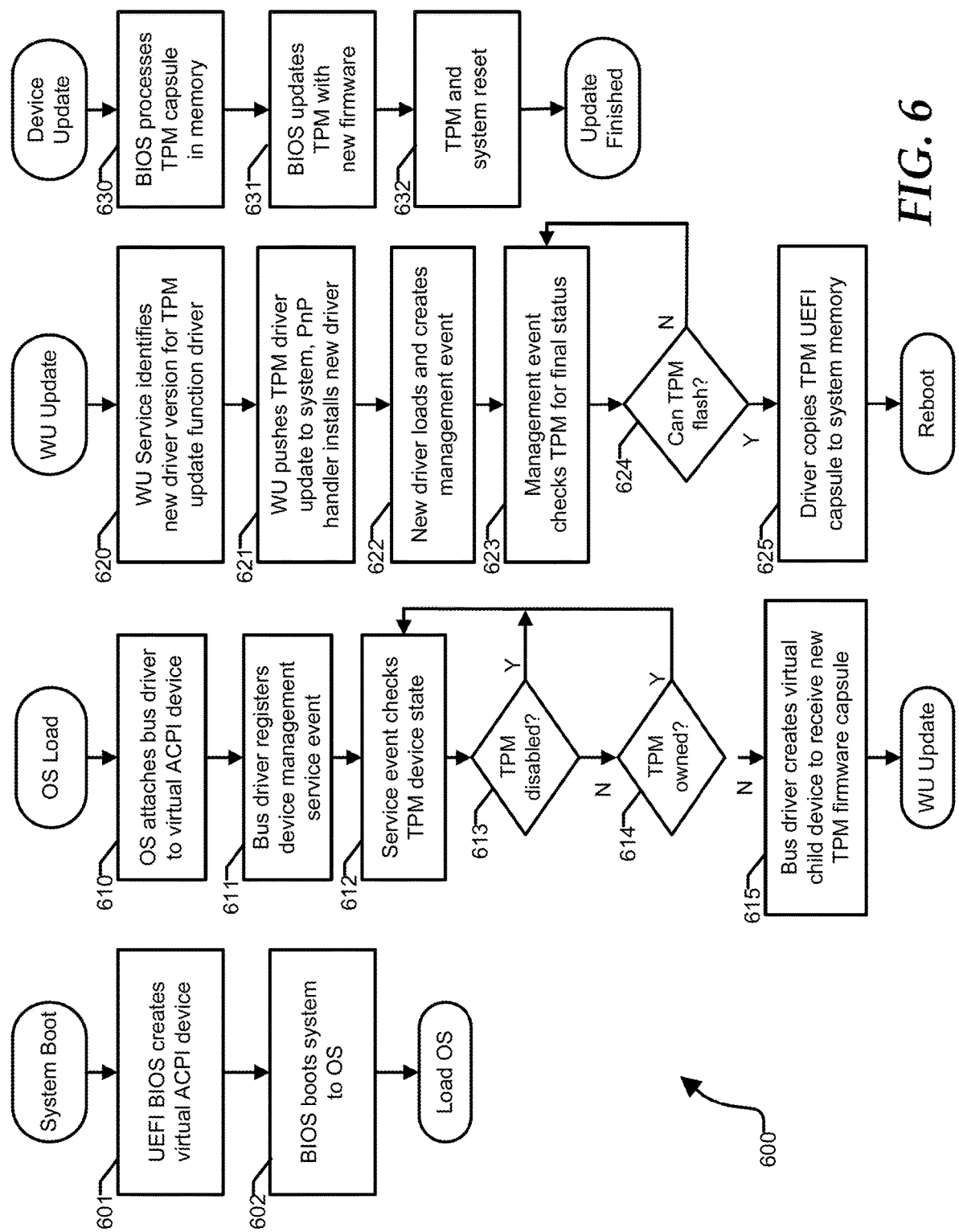
FIG. 6 is a flow diagram illustrating a method for conditionally updating firmware at a target device according to a specific embodiment of the present disclosure.

FIG. 6 shows a method 600 for conditionally updating firmware at a target device according to a specific embodiment of the present disclosure. Method 600 includes the features of methods 300, 400, and 500, but shows the entire process and context of the techniques disclosed herein. Method 600 includes blocks 601-602 that are performed by BIOS code during the boot initialization of an information handling system, blocks 610-615 that are performed by the operating system, blocks 620-625 that pertain to receiving a firmware capsule from a WU server using a virtual function driver, and blocks 630-632 that are performed during a final reboot of the information handling system.

Method 600 begins at block 601, where a system boot is initiated and UEFI BIOS creates a virtual ACPI device. This virtual device provides the foundation for performing prerequisite tests that are desired to be performed before allowing the firmware of a target device to be updated. For the purpose of example, method 600 is directed to a TPM device and corresponding firmware. At block 602, the boot sequence completes by initiating loading of an OS, such as Windows 10. At block 610, the OS attaches a bus driver to the virtual ACPI bus device created at block 601. At block 611, the bus driver registers for a device management service event, which may alternatively be referred to as a timed event or timer event. At block 612, code associated with the service event performs prerequisite tests that are directed to determining whether the target device is reading to receive updated firmware. For this example, the target device is a TPM. However, one of skill will appreciate that the prerequisite tests administered by the virtual ACPI bus device driver can support any number of target devices.

At block 613, the service event determines whether the TPM is disabled, and at block 614, the service event determines whether the TPM is currently owned. If the TPM is disabled or owned, the method 600 returns to block 612, as the TPM is not ready to receive new firmware. If however the TPM is not disabled and is not presently owned, method 600 proceeds to block 615 where the bus driver creates a virtual child device. The virtual child device is symbolically associated with the TPM, and a subsequent update of the child device driver will include a TPM firmware capsule. Accordingly, the child device driver can be referred to as a TPM update function driver. Method 600 continues at block 620 where the WU service, for example a PnP manager, determines that a new version of the TPM update function driver is available at the WU server. At block 621, the WU server pushes the new version of the TPM update function driver to the information handling system and the PnP handler can install the new driver. The TPM update function driver received from the WU server includes a UEFI capsule that contains updated TPM firmware. At block 622, the new driver is loaded. Like the virtual ACPI bus device driver registered a device management service event, so also can the child device driver (the TPM function driver).

At block 623, the management event checks the TPM for a final status, for example verifying that the TPM firmware storage device is capable of being flashed. If the TPM cannot be flashed, the method returns from conditional block 624 to block 623. If however the TPM is found ready for flashing the TPM firmware storage device, method 600 proceeds from conditional block 624 to block 625. At block 625, the driver copies new TPM firmware (contained in the UEFI capsule that accompanied the updated TPM function driver received from the WU server) to system memory. As described above, a firmware update flag is set and a reboot of the information handling system is initiated. At block 630, the BIOS processes the TPM capsule that was stored at system memory. At block 631, the BIOS updates the TPM with the new firmware contained in the UEFI capsule. At block 632, the TPM is reset and the update of the TPM firmware is complete.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    creating, by system firmware at an information handling system, an Advanced Configuration and Power Interface (ACPI) ID corresponding to a virtual ACPI bus device;
    providing a bus device driver corresponding to the virtual ACPI bus device;
    registering, by the bus device driver, a management service event, the management service event, when executed, to determine whether a target device is in a condition to receive revised firmware;

creating, by the bus device driver, a virtual child device corresponding to the virtual ACPI bus device;

providing a function driver corresponding to the virtual child device;

receiving an updated version of the function driver from an update server, the updated version of the function driver including a firmware capsule containing the revised firmware for the target device; and registering, by the function driver, a second management service event, the second management service event, when executed, to determine whether the target device is in a condition to receive the revised firmware.

2. The method of claim 1, further comprising:

storing the revised firmware for the target device at a storage device;

initiating a reboot of the information handling system; and storing the revised firmware at a firmware memory associated with the target device.

3. The method of claim 1, wherein the target device is a Trusted Platform Module (TPM).

4. The method of claim 3, wherein determining whether the state of the target device is in a condition to receive revised firmware comprises determining that the TPM is not owned by an application executing at the information handling system.

5. The method of claim 1, wherein the target device is a basic input/output system (BIOS) at the information handling system, and the revised firmware is BIOS firmware.

6. The method of claim 1, wherein the target device is a docking station, and determining whether the target device is in a condition to receive revised firmware comprises determining that the docking station is functionally coupled to the information handling system.

7. The method of claim 1, wherein the management service event is configured to determine whether the state of the target device is in a condition to receive the revised firmware independent of a status at an Extensible Firmware Interface system resource table.

8. The method of claim 1, wherein in response to determining that a second target device is in a condition to receive revised firmware, the method further comprises:

creating, by the bus device driver, a second virtual child device;

providing a second function driver corresponding to the second virtual child device of the virtual ACPI bus device; and receiving an updated version of the second function driver from a Windows Update server, the updated version of the second function driver including a firmware capsule containing revised firmware for the second target device.

9. An information handling system comprising:

a processor;

a target device and corresponding firmware; and a memory device to store system firmware, the system firmware executable by the processor to:

create an Advanced Configuration and Power Interface (ACPI) ID corresponding to a virtual ACPI bus device;

provide a bus device driver corresponding to the virtual ACPI bus device; and cause the bus device driver to register a management service event, the management service event, when executed, to determine whether the target device is in a condition to receive revised firmware, wherein in response to determining that the target device is in a condition to receive revised firmware, the system firmware is further to:

create, by the bus device driver, a virtual child device corresponding to the virtual ACPI bus device;

provide a function driver corresponding to the virtual child device, the function driver to register a second management service event, the second management service event, when executed, to determine whether the target device is in a condition to receive the revised firmware; and receive an updated version of the function driver from an update server, the updated version of the function driver including a firmware capsule containing the revised firmware for the target device.

10. The information handling system of claim 9, wherein the system firmware is further to:

store the revised firmware for the target device at a storage device;

initiate a reboot of the information handling system; and store the revised firmware at a firmware memory associated with the target device.

11. The information handling system of claim 9, wherein the target device is a basic input/output system (BIOS) at the information handling system, and the revised firmware is BIOS firmware.

12. The information handling system of claim 9, wherein the management service event is configured to determine whether the target device is in a condition to receive the revised firmware independent of a status at an Extensible Firmware Interface system resource table.

13. The information handling system of claim 9, wherein in response to determining that a second target device is in a condition to receive revised firmware, the system firmware is further to:

create, by the bus device driver, a second virtual child device corresponding to the virtual ACPI bus device;

provide a second function driver corresponding to the second virtual child device; and receive an updated version of the second function driver from a Windows Update server, the updated version of the second function driver including a firmware capsule containing revised firmware for the second target device.

14. A method comprising:

creating, by system firmware at an information handling system, an Advanced Configuration and Power Interface (ACPI) ID corresponding to a virtual ACPI bus device;

providing a bus device driver corresponding to the virtual ACPI bus device, the bus device driver to determine whether a target device is in a condition to receive revised firmware;

in response to determining, by the bus device driver, that the target device is in a condition to receive the revised firmware, creating a virtual child device corresponding to the virtual ACPI bus device;

providing a function driver corresponding to the virtual child device; and receiving an updated version of the function driver from a Windows Update server, the updated version of the function driver including a firmware capsule containing the revised firmware for the target device, wherein the bus device driver is to determine whether the target device is in a condition to receive the revised firmware by registering a management service event, the management service event, when executed, to determine whether the target device is in a condition to receive the revised firmware.

15. The method of claim 14, wherein in response to determining that a second target device is in a condition to receive revised firmware, the method further comprises:
creating, by the bus device driver, a second virtual child device;
providing a second function driver corresponding to the second virtual child device; and
receiving an updated version of the second function driver from a Windows Update server, the updated version of the second function driver including a firmware capsule containing revised firmware for the second target device.

* * * * *